United States Patent
Lu et al.

(10) Patent No.: US 11,172,237 B2
(45) Date of Patent: Nov. 9, 2021

(54) INTER-LAYER DYNAMIC RANGE SCALABILITY FOR HDR VIDEO

(71) Applicant: Dolby Laboratories Licensing Corporation, San Francisco, CA (US)

(72) Inventors: Taoran Lu, Santa Clara, CA (US); Peng Yin, Ithaca, NY (US); Fangjun Pu, Sunnyvale, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/005,333

(22) Filed: Aug. 28, 2020

(65) Prior Publication Data

US 2021/0076079 A1    Mar. 11, 2021

Related U.S. Application Data

(60) Provisional application No. 62/898,664, filed on Sep. 11, 2019.

(51) Int. Cl.
| | |
|---|---|
| *H04N 19/98* | (2014.01) |
| *H04N 19/136* | (2014.01) |
| *H04N 19/46* | (2014.01) |
| *H04N 19/33* | (2014.01) |
| *H04N 19/186* | (2014.01) |
| *H04N 19/187* | (2014.01) |
| *H04N 19/172* | (2014.01) |

(52) U.S. Cl.
CPC .......... *H04N 19/98* (2014.11); *H04N 19/136* (2014.11); *H04N 19/172* (2014.11); *H04N 19/186* (2014.11); *H04N 19/187* (2014.11); *H04N 19/33* (2014.11); *H04N 19/46* (2014.11)

(58) Field of Classification Search
CPC ...... H04N 19/98; H04N 19/136; H04N 19/46; H04N 19/33; H04N 19/186; H04N 19/187; H04N 19/172; H04N 19/117; H04N 19/70
USPC ..................................................... 375/240.08
See application file for complete search history.

(56) References Cited

U.S. PATENT DOCUMENTS

| | | | |
|---|---|---|---|
| 2014/0218473 A1* | 8/2014 | Hannuksela | ......... H04N 19/176 348/43 |
| 2015/0098510 A1* | 4/2015 | Ye | ........................ H04N 19/597 375/240.16 |
| 2020/0267392 A1 | 8/2020 | Taoran | |

FOREIGN PATENT DOCUMENTS

WO    2019160986    8/2019

OTHER PUBLICATIONS

V. Nascimento, J. Ascenso and F. Pereira, "H.264/AVC backward compatible bit-depth scalable video coding," 2014 IEEE 16th International Workshop on Multimedia Signal Processing (MMSP), 2014, pp. 1-6, doi: 10.1109/MMSP.2014.6958829. (Year: 2014).*

(Continued)

*Primary Examiner* — Marnie A Matt

(57) ABSTRACT

Methods, processes, and systems are presented for inter-layer scaling and mapping to perform dynamic-range scalability in video coding using single-loop video decoders. Two approaches are proposed: a) A mapping function is applied to each of the color components, b) a mapping function is applied to the luma component and luma-based scaling is applied to the chroma components. Both schemes may be combined with existing schemes for in-loop reshaping, such as luma mapping and chroma residual scaling employed in the versatile video codec (VVC).

10 Claims, 7 Drawing Sheets

(56) References Cited

OTHER PUBLICATIONS

Bross, B. et al "Versatile Video Coding (Draft 6)" JVET of ITU-T SG 16 15th Meeting, Jul. 2019.
Chen, J. et al Algorithm Description for Versatile Video Coding and Test Model 4 (VTM4) Jan. 2019.
Francois, E. et al HDR CE2:Report of Experiment CE2.b-1 on SDR-Backward Compatible Configuration (reshape Setting 1) Feb. 2016.
ITU-R BT.2020-2 "Parameter Values for Ultra-high Definition Television Systems for Production and International Programme Exchange" Recommendation Oct. 2015.
ITU-R BT.709-6 "Parameter Values for the HDTV Standards for Production and International Programme Exchange" Jun. 2015.
JCTVC-W0092:"Description of the Exploratory Test Model (ETM) for HDR/WCG extension of HEVC".
SMPTE Standard 2084:2014"High Dynamic Range Electro-Optical Transfer Function of Mastering Reference Displays".

\* cited by examiner

INTER-LAYER DYNAMIC RANGE SCALABILITY FOR HDR VIDEO

CROSS-REFERENCE TO RELATED APPLICATIONS

This application claims priority to U.S. Provisional Patent Application No. 62/898,664, filed Sep. 11, 2019.

TECHNOLOGY

The present document relates generally to images and video coding. More particularly, an embodiment of the present invention relates to enabling inter-layer dynamic-range scalability in high dynamic range (HDR) video coding.

BACKGROUND

In 2013, the MPEG group in the International Standardization Organization (ISO), jointly with the International Telecommunications Union (ITU), released the first draft of the HEVC (also known as H.265) video coding standard. More recently, the same group has been working on the development of the next generation coding standard (referred to as Versatile Video Coding or VVC standard (Ref. [1])) that provides improved coding performance over existing video coding technologies.

As used herein, the term 'bit depth' denotes the number of pixels used to represent one of the color components of an image. Traditionally, images were coded at 8-bits, per color component, per pixel (e.g., 24 bits per pixel); however, modern architectures may now support higher bit depths, such as 10 bits, 12 bits or more.

In a traditional image pipeline, captured images are quantized using a non-linear opto-electronic function (OETF), which converts linear scene light into a non-linear video signal (e.g., gamma-coded RGB or YCbCr). Then, on the receiver, before being displayed on the display, the signal is processed by an electro-optical transfer function (EOTF) which translates video signal values to output screen color values. Such non-linear functions include the traditional "gamma" curve, documented in ITU-R Rec. BT.709 and BT. 2020, the "PQ" (perceptual quantization) curve described in SMPTE ST 2084, and the "Hybrid Log-gamma" or "HLG" curve described in and Rec. ITU-R BT. 2100.

As used herein, the term "forward reshaping" denotes a process of sample-to-sample or codeword-to-codeword mapping of a digital image from its original bit depth and original codewords distribution or representation (e.g., gamma or PQ or HLG, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the reshaped signal, the receiver may apply an "inverse reshaping function" to restore the signal to its original codeword distribution.

The term "scalable video coding" refers to the coding of a bitstream that contains a basis bitstream and one or more enhancement-layer bitstreams. A decoder may choose to decode just the basis bitstream, or it may combine the basis bitstream with one or more of the enhancement-layer bitstreams to generate an enhanced output bitstream (enhanced in terms of bit-depth, resolution, frame-rate, and the like). For example, scalable video coding is described in Annex G of the H.264 (AVC) specification.

As appreciated by the inventors here, as development continues for the next generation of a video coding standard, techniques for dynamic-range and/or color-gamut scalability in video coding are desired. Methods of this invention can be applicable to a variety of video content, including, but not limited, to content in standard dynamic range (SDR) and/or high-dynamic range (HDR).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Techniques for inter-layer mapping and scaling to perform dynamic-range scalability in video coding are described herein. In the following description, for the purposes of explanation, numerous specific details are set forth in order to provide a thorough understanding of the various embodiments of the present invention. It will be apparent, however, that the various embodiments of the present invention may be practiced without these specific details. In other instances, to avoid redundancies and improve readability, well-known structures and devices are not described in exhaustive detail.

SUMMARY

Example embodiments described herein relate to inter-layer mapping and scaling for dynamic-range and color-gamut scalability in video coding. In a decoder, a processor receives a coded bitstream comprising layers of video frames, wherein a first layer of frames is coded in a first dynamic range and a second layer of frames is coded in a second dynamic range different than the first dynamic range.

The decoder receives metadata for the coded bitstream, wherein the metadata comprise: a flag indicating that dynamic-range scalability is enabled, and a mapping data structure comprising parameters to determine a mapping function for mapping pixel values from the first dynamic range to the second dynamic range. The decoder decodes a video frame in the second layer with reference to a video frame in the first layer using inter-layer mapping and scaling, wherein inter-layer mapping and scaling comprises: generating a first mapping function based on the mapping data structure, decoding an input reference frame in the first layer in the first dynamic range, wherein the input reference frame comprises a first color component and a second color component, mapping the input reference frame in the first layer to an output reference frame in the second dynamic range based on the first mapping function, and generating an output frame in the second dynamic range based on the video frame in the second layer and the output reference frame in the second dynamic range.

Example Video Delivery Processing Pipeline

Figure 1:
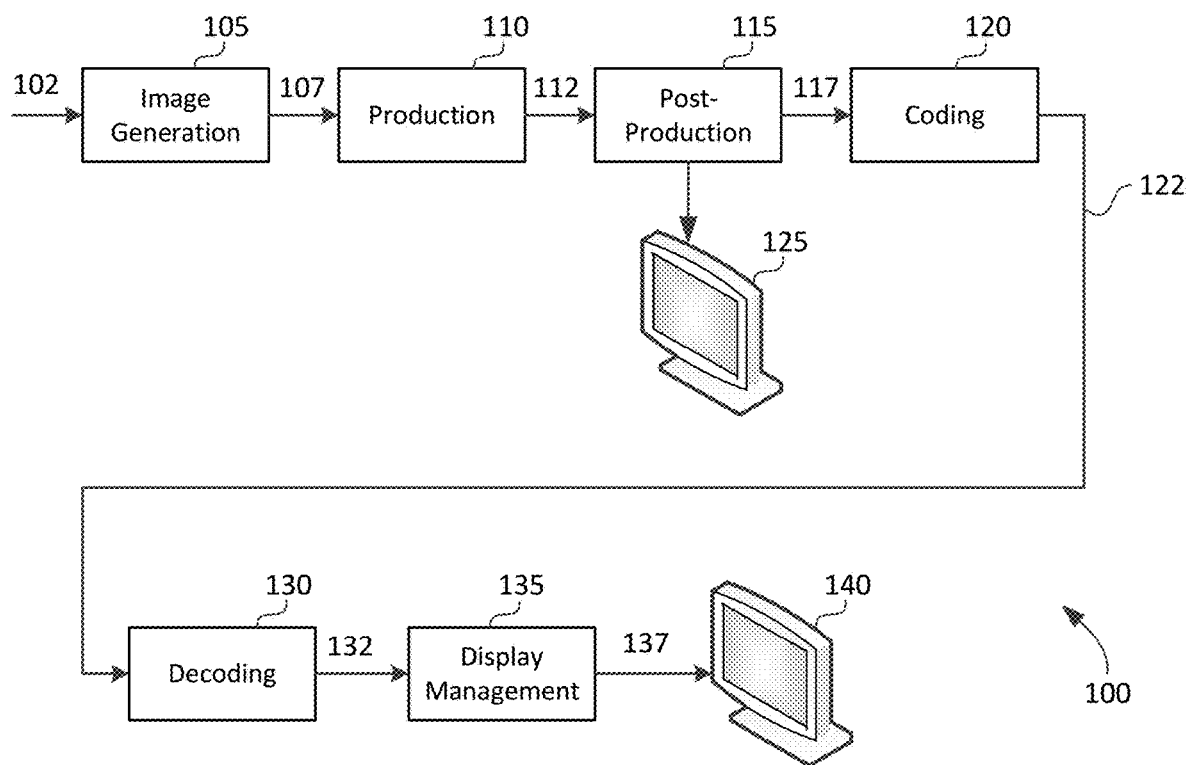
FIG. 1 depicts an example process for a video delivery pipeline according to prior art.

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Signal Reshaping

Figure 2A:
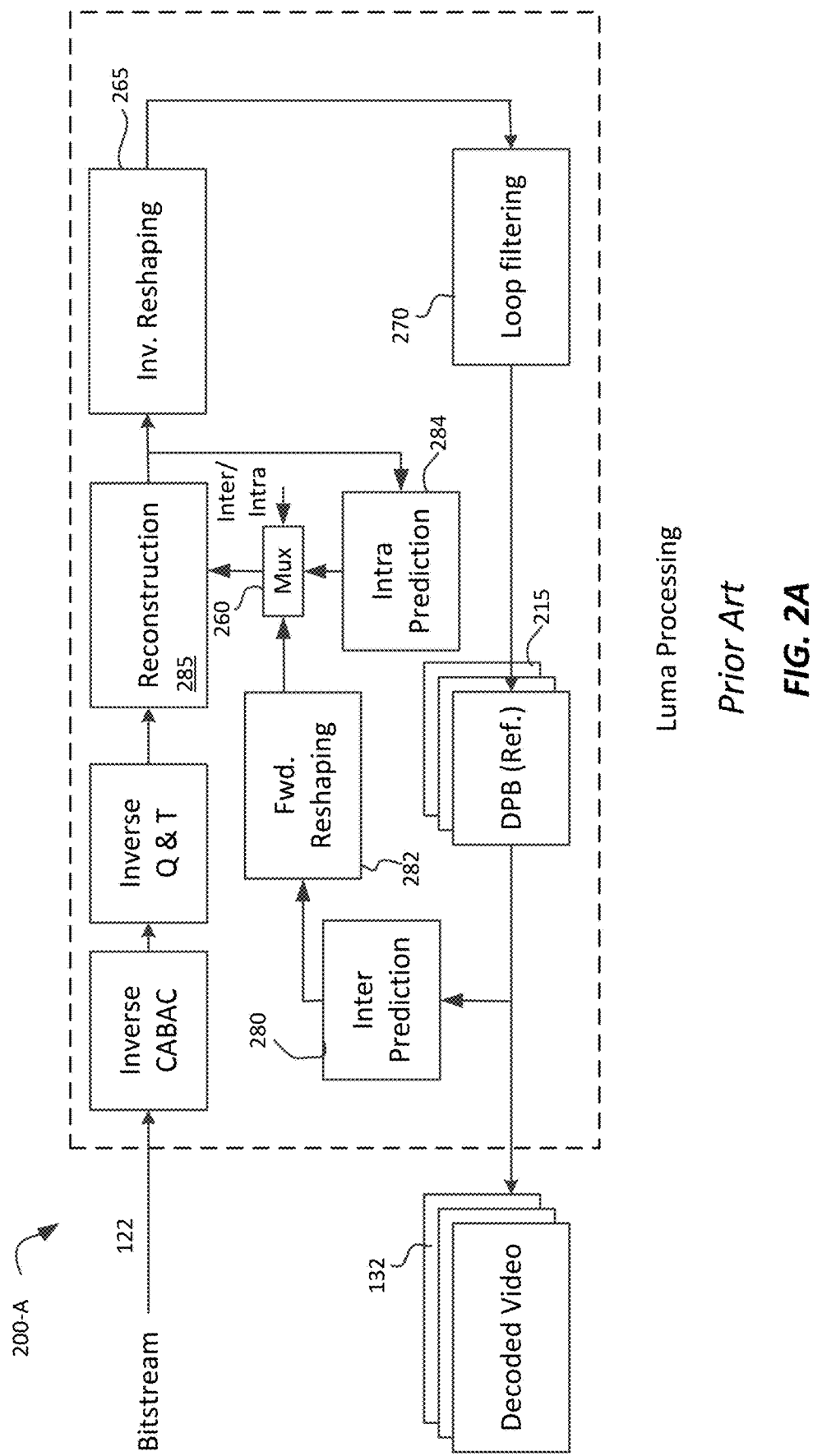
FIG. 2A depicts an example architecture for in-loop decoding of luma data according to prior art.
Figure 2B:
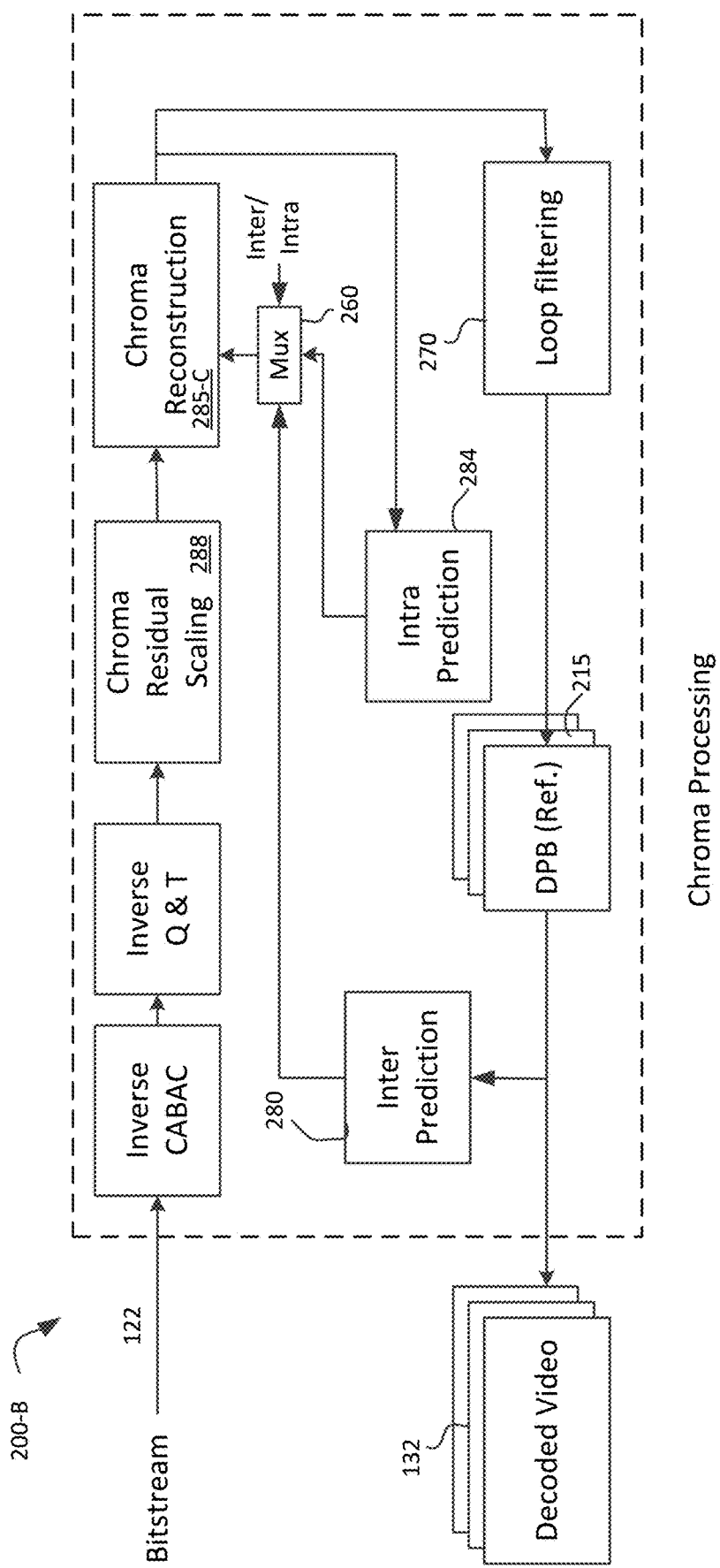
FIG. 2B depicts an example architecture for in-loop decoding of chroma data according to prior art.

As used herein, the term "reshaper" may denote a forward or an inverse reshaping (or mapping) function to be used when coding and/or decoding digital images. FIG. 2A and FIG. 2B depict example decoding processes for in-loop signal reshaping according to Refs. [1-3]. In VVC, reshaping is referred to as LMCS—Luma Mapping with Chroma residue Scaling. Process 200-A is related to luma processing and process 200-B is related to chroma processing.

For luma, given a coded bitstream (122), after inverse arithmetic coding (e.g. inverse CABAC) and inverse quantization and transform (Inverse Q & T), in the reconstruction module (285), given the output $Y_{res}$ of Inverse Q & T, for Inter-coded units (CUs) (e.g., the Mux (260) enables the output from 280 and 282), its output $Y_r$ is computed as:

$$Y_r = (Y_{res} + \text{FwdMap}(Y_{pred})), \quad (1)$$

where $\text{FwdMap}(Y_{pred})$ denotes the output (e.g., $Y_{pred}$) of the inter predictor (280) followed by forward reshaping (282) using forward reshaping function FwdMap( ). Otherwise, for Intra CUs (e.g., the Mux (260) enables the output from intra prediction unit 284), the output of the reconstruction module (285) is $$Y_r = (Y_{res} + I\text{PredSample}), \quad (2)$$

where IPredSample denotes the output of the Intra Prediction block (284). Given an inverse reshaping function InvMap( ), the inverse Reshaping block (265), generates $$Y_{ir} = \text{InvMap}(Y_r). \quad (3)$$

Inverse reshaping (265) is followed by traditional loop filtering (270) in the original domain, and the output of loop filtering is stored in the display-picture-buffer (DPB) (215) to be used as reference pictures for inter prediction (280) or to generate the decoded video (132).

For chroma, when in-loop reshaping is enabled, as depicted in FIG. 2B, the following changes are made:
 The forward and reverse reshaping blocks (282 and 265) blocks are not used
 There is a new chroma residual scaling block (288); and
 The reconstruction block (285-C) is modified to handle color residuals as $$\text{CxRec} = \text{CxPred} + \text{CxRes}, \quad (4)$$

where CxRes denotes the output of chroma residual scaling block (288), CxPred denotes the output of predicted chroma samples, generated either by the Intra (284) or Inter (280) Prediction blocks, and CxRec denotes the output.

Let CxResScaled denote the extracted scaled chroma residual signal after inverse quantization and transform (before block 288), and let $$\text{CxRes} = \text{CxResScaled} * C_{ScaleInv}, \quad (5)$$

denote the rescaled chroma residual generated by the Chroma Residual scaling block (288) to be used by the reconstruction unit (285-C) to compute its output according to equation (4).

The $C_{ScaleInv}$ value being used for a Transform Unit (TU) may be shared by the Cb and Cr components, it is luma dependent, and can be computed as follows:
 Regardless of the coding mode, the average $\text{avgY'}_{TU}$ is calculated using luma reconstructed samples from the top row and left column neighbors (when available) of the current virtual pipeline data unit (VPDU).
 In an embodiment, one can apply a LUT to compute $C_{ScaleInv}$ based on $\text{avgY'}_{TU}$. Alternatively, given a piece-wise-linear (PWL) representation of the reshaping function one may find the index idx where the value $\text{avgY'}_{TU}$ belongs to in the inverse-mapping PWL. Then, $C_{ScaleInv} = \text{cScaleInv}[\text{idx}]$ An example implementation, as it is applicable to the Versatile Video Coding codec can be found in Ref. [1].

Based on the previous descriptions, LMCS includes the following key processing blocks:

1. A signaling building block, which enables the signaling of a piecewise linear function to determine the forward reshaping function for the luma. VVC supports a model with up to 16 equal length pieces, determined via an adaptation parameter set (APS), and can provide flexible adaptation/updates via the APS update mechanism.

2. A "mapping" building block, which can perform sample to sample mapping (reshaping) using piecewise linear interpolation based on the signaled model (in the current VVC draft, it is used to perform forward and inverse luma mapping, (e.g., 282 and 265));

3. A "scaling" building block, which can perform sample-based scaling process (in the current VVC draft, it is used to perform chroma residue scaling 288).

Scalability in VVC

In the latest draft of the VVC specification (Ref. [1]), spatial, temporal and SNR scalability can co-exist by a combination of reference picture resampling (RPR) and proper signaling in the reference picture set (RPS). The RPS is used to define prediction relationships between the base layer and enhancement layer(s). In spatial scalability, while predicting from a base layer picture with different spatial resolution than the enhancement layer, the RPR is used to resample the decoded base layer pictures to the same resolution as the enhancement layer before being used as reference pictures by the enhancement layer(s).

Thus, a single-loop VVC decoder (referred to as a VVC version 1 decoder) can decode a bitstream with spatial and temporal scalability. In contrast, in previous scalable coding frameworks, such as SHVC, the scalable extension of HEVC, scalability required a multi-loop decoder to decode a spatially-scalable bitstream. In Ref. [1], the process for the RPR is incorporated into the "fraction sample interpolation process," described in Section 8.5.6.3, as a "block-based" process. Unlike HEVC (and SHVC), there is no extra or stand-alone process to perform filtering/re-sampling on a "picture" basis.

Dynamic Range and Color-Gamut Scalability

Dynamic range and color-gamut scalability refers to a scenario wherein a scalable bitstream includes pictures at multiple dynamic ranges and/or color gamuts, e.g., pictures in a standard-dynamic range (SDR) at 100 nits, and pictures in a high dynamic range (HDR) at 1,000 nits or higher. For example, a base layer may include an SDR bitstream at 1920×1080 resolution, 8-bits bit-depth, 30 fps, using a BT. 709 EOTF (gamma) and color gamut. In contrast, an enhancement layer may include an HDR wide-color-gamut stream at 3,840×2,160 resolution, 10-bits bit-depth, 60 fps, using the PQ EOTF and BT. 2100 color gamut.

Figure 3:
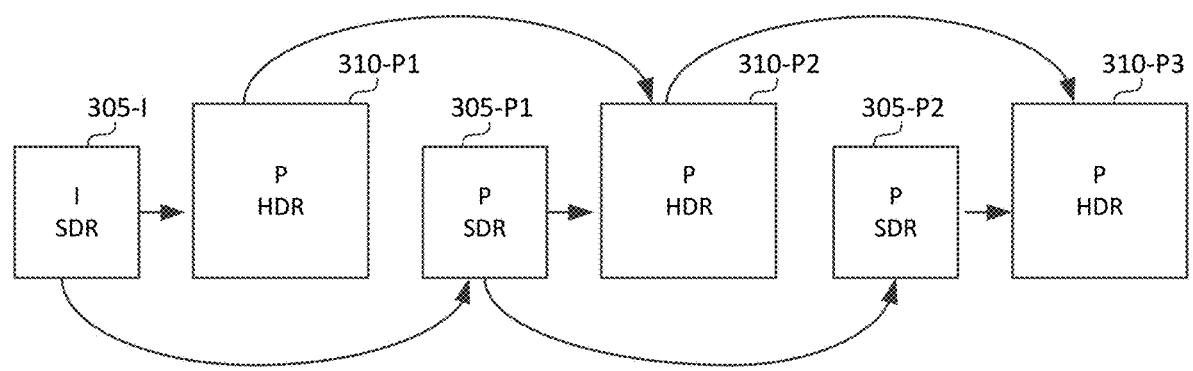
FIG. 3 depicts an example bitstream with spatial and dynamic range scalability according to an embodiment.

As an example, FIG. 3 depicts an example of a bitstream with both spatial and dynamic range scalability. It includes two streams, an SDR low-resolution stream (305) and a HDR, higher-resolution stream, 310. Arrows denote possible inter-coding dependencies. For example, HDR frame 310-P1 depends on SDR frame 305-I. To predict blocks in 310-P1, a decoder will need to up-scale 305-I and also map 305-I from SDR to HDR. Similarly, HDR frame 310-P2 may depend on HDR frame 310-P1 and SDR frame 305-P1. Any predictions from SDR frame 305-P1 will require a spatial up-scaling and a dynamic-range remapping from SDR to HDR. Note that spatial scaling may precede dynamic-range mapping, but in other embodiments, dynamic range mapping may precede scaling. In other embodiments, the order of SDR and HDR frames could also be reversed, thus the base layer could be the HDR stream and the enhancement layer could be the SDR stream. Alternatively, in other embodiments, all the layers can be HDR layers but with different dynamic range (e.g., layers at 1,000 nits, 2,000 nits, 3,000 nits and the like).

To support inter-layer dynamic range scalability, two embodiments are proposed. Without loss of generality, for simpler implementations, both are using two or more of the three main processing components of the LMCS tool: signaling of mapping functions, luma mapping, and chroma scaling.

Luma-Chroma Independent Processing

Let C denote the color component of an image (e.g., C=Y, Cb, or Cr). In an embodiment, each color component is treated as an independent entity with a separate dynamic-range mapping function, each one represented using, as in LMCS, 16-segment piece-wise-linear (PWL) models. The 16-piece PWL model is used only to match the current VVC architecture. In other embodiments, alternative implementations as known in the art could be used, such as PWL models with fewer or more segments, look-up tables, non-linear models, and the like.

In VVC, these mapping functions can be transmitted as lmcs_data( ) (see definition in Table 1) using different APSs to construct look-up tables (LUTs) mapping pixel values from one dynamic range to another. In an embodiment, these mapping functions may be updated at the frame level, the scene level, or any other suitable interval; however, it may be preferred to update them at the scene level to avoid fluctuations and visible artifacts within a scene. In an embodiment, a new APS variable is proposed (say, ILMS_APS) to avoid introducing confusion with the existing LMCS APS. In more detail, in an encoder:

One needs to derive the mapping relationship between the base layer and the enhancement layer for each color component. For example, if $C_{REF}$ refers to the reference color values in the base layer, $C_{EL}$ refers to the target color in the enhancement layer, and $LUT_C[C_{REF}]$ refers to the mapping function from the reference color to an estimate of the color in the enhancement layer, then, in an embodiment, $LUT_C[C_{REF}]$ can be derived to minimize the absolute or mean-square error between the two values $$Cerror = \Sigma(|C_{EL} - LUT_C[C_{REF}]|)^n, \qquad (6)$$

where n=1 when using an L1 metric and n=2 when using an L2 metric, and the summation can be across the full set or a subset of the pixels in a frame or a scene.

Given the $LUT_C$ derived from the earlier step, one needs to approximate it using the desired parametric model (e.g. a 16-piece PWL model) and then generate the appropriate syntax elements (e.g., see Table 1 or Table 4)

Finally, the encoder needs to generate the coded bitstream by taking into consideration the remapping process. For example, assuming RPR processing precedes the dynamic-range remapping process, given an inter-layer reference block (ILRP) ($C_{ILRP}$) (e.g., a block in SDR P-frame 305-P1)

$$C_{REF} = RPRprocess(C_{ILRP}), \qquad (7)$$

$$C_{PRED} = LUT_C[C_{REF}]. \qquad (8)$$

Similarly, in the decoder, one needs to:

Receive and parse the ILMS_APS syntax to extract the syntax elements of the PWL mapping Construct the PWL model for each color component C based on the corresponding APS values During decoding, apply the remapping to each ILRP block using equations (7-8).

Note that as discussed earlier, in another embodiment, the order of RPR processing and remapping (in both the encoder and the decoder) could also be reversed, as in:

$$C_{REF}=LUT_C[C_{ILRP}], \quad (9)$$

$$C_{PRED}=\text{RPRprocess}[C_{REF}]. \quad (10)$$

In embodiments where the base layers and enhancement layers have the same spatial resolution the RPR processing steps (e.g., equations (7) and (10)) may be skipped.

Figure 4A:
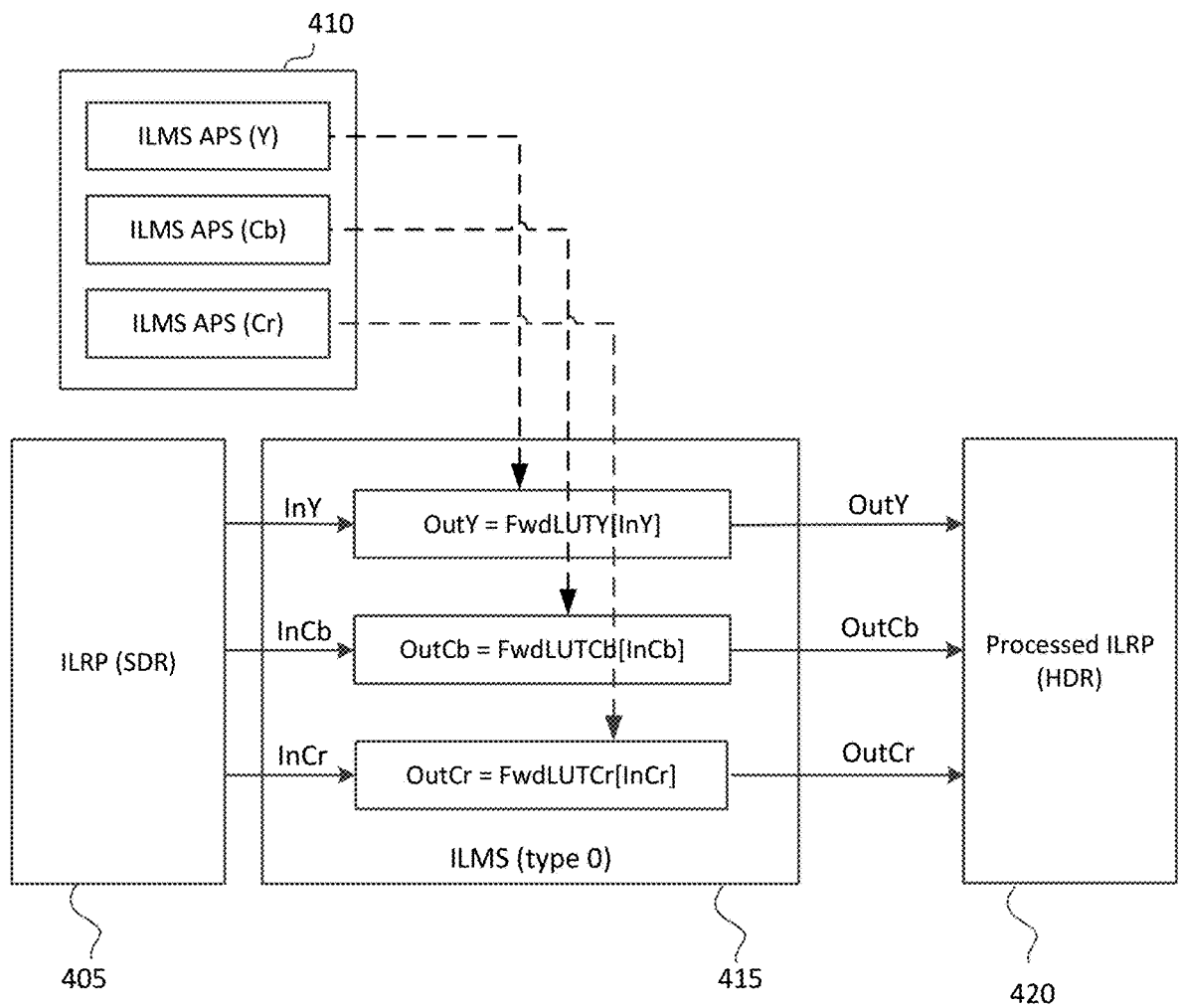
FIG. 4A depicts an example process for SDR to HDR dynamic-range scalability according to a first embodiment.

As an example, FIG. 4A depicts an example data flow when remapping SDR data (405) into HDR data (420). The remapping is performed for all three color components (Y, Cb, and Cr); however, in other embodiments, remapping for the chroma components could be skipped. For ease of reference, this embodiment will be referred to as ILMS (type 0), where ILMS stands for inter-layer (dynamic-range) mapping and scaling.

Figure 2C:
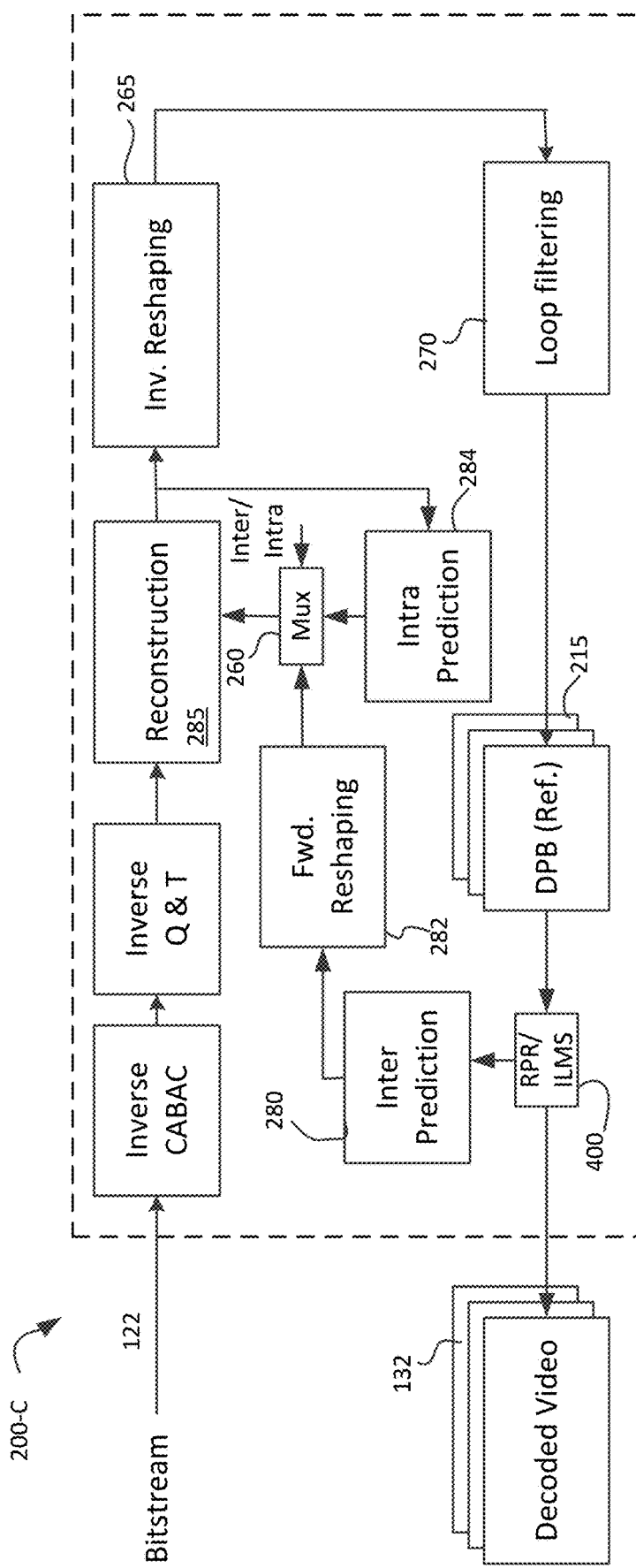
FIG. 2C depicts an example architecture for in-loop decoding of luma data with dynamic-range scalability according to an embodiment.

FIG. 2C depicts an example data flow for decoding using both luma in-loop reshaping and dynamic range scalability. Compared to system 200-A, system 200-C includes an RPR/ILMS block (400) to perform dynamic-range scalability, where block 400 may be performing operations according to equations (7-8) or (9-10).

Treating each color component independently offers a variety of advantages, including a simpler implementation and applicability to both color-difference formats (YCbCr, ICtCp, and the like) and non-color-difference formats (RGB and the like); however, the quality of predicted color values may not be as accurate as when one takes into consideration cross-color inter-dependencies.

It was observed that in some sequences chroma components may have a cross-component correlation between the SDR and HDR layers. To improve the mapping performance, in an embodiment, the HDR signal can be pre-processed to use the same EOTF function as the base SDR signal. For example, if HDR is PQ coded and SDR is gamma coded, the PQ-coded signal can be translated to gamma before computing the mapping LUT in the encoder. For example, one may perform:

PQ to linear mapping

Linear mapping to gamma mapping

In a decoder, gamma-mapped HDR signals will need to be converted back to PQ-coded signals. Such transformations requires additional pre- and post-processing, outside of the core VVC normative coding process, perhaps via supplementary metadata.

In a simplified user case, both the base layer and enhancement layer signal may be HDR signals, but with different dynamic range. For example, the base layer may be 1,000 nits, 10-bit, HDR PQ (or HLG) signal, and the enhancement layer may be 4,000 nits HDR PQ (or HLG) signal. Such a base layer signal is most commonly used in what is commonly referred to as an HDR10 signal. It is expected that in the future the dynamic range provided by HDR10 signals can be significantly improved. For such scalability, the proposed scalability scheme (e.g., ILMS (type 0)) is a very good fit. ILMS (type 0) can be further simplified when only luma mapping is needed and chroma mapping is skipped.

In an embodiment, to reduce the implementation cost, at the decoder side, ILMS (400) could be combined with the LMCS process. In such a scenario, in FIG. 2C, the order of ILMS processing in block 400 and inter-prediction (280) can be switched as well, thus making it possible to cascade the ILMS FwdLUT mapping (415) with the LMCS FwdLUT reshaping (282) into a single process. In an embodiment, an example of such a combination is given by the following:

Given a predicted signal x, for ILMS luma mapping, one can write $$y=Yi+ai^*(x-Xi), \quad (11)$$

where Xi is an input pivot and Yi is and output pivot.

For LMCS luma mapping, one can write $$z=Zj+bj^*(y-Yj), \quad (12)$$

where y denotes the output from ILMS, Yj is an input pivot, and Zj is output pivot. By combining the two equations:

$$z=Zj+bj^*(Yi+ai^*(x-Xi)-Yj)=(Zj+bj^*(Yi-Yj)-bj^*ai^*Xi)+bj^*ai^*x. \quad (13)$$

When x and y are in the same segment, equation (13) can be further simplified as $$z=Zi+bi^*ai^*(x-Xi). \quad (14)$$

This simplified architecture is best suited in high dynamic range scalability where chroma mapping is no needed. To address cases where there is cross-color correlation between SDR and HDR layers, a second embodiment is proposed, where luma-based chroma scaling is added.

Luma-Chroma Inter-Dependent Processing

In an embodiment, cross-color correlation is addressed by deriving for each color pixel a scaler derived from the collocated luma pixel. Assume $C_{REF}$ values need to be mapped to $C_{PRED}$ values. Let $$S_C=Y_{col}^*\text{Scale}[i]+\text{Offset}[i], \quad (15)$$

denote a scaling factor, where, for a chroma pixel, $Y_{col}$ denotes the co-located luma value, and Scale[i] and Offset[i] denote the slope and offset of the i-th PWL segment in the reshaping function. In practice, $Y_{col}$ can be the co-located luma component of the inter-layer reference picture $Y_{REF}$, after RPR processing (e.g., $Y_{REF}=\text{RPRprocess}(Y_{ILRP})$). Then $$C_{PRED}=O+S_C(C_{REF}-O), \quad (16)$$

where $$C_{REF}=\text{RPRprocess}(C_{ILRP}), \quad (17)$$

$$O=1<<(\text{BitDepthC}-1), \quad (18)$$

where O denotes the zero mean offset and BitDepthC denotes the bit-depth of the C color component. In an embodiment, in an encoder:

$LUT_Y[Y_{REF}]$ can be derived to minimize the absolute or mean-square error, as in $$\text{errorY}=\Sigma(|Y_{EL}-LUT_Y[Y_{REF}]|)^n, \quad (19)$$

where n=1 when using an L1 metric and n=2 when using an L2 metric.

From equation (16), if both coded layers have the same bit depth, $$S_C = \frac{C_{PRED} - O}{C_{REF} - O}$$

If the bit-depths of the C color components are different between layers, then O values should be calculated for each layer in correspondence to its bit-depth, thus equation (16) should be rewritten as:

$$C_{PRED}=O_{cur}+S'_C(C_{REF}-O_{ref}), \quad (20)$$

where $$O_{cur}=1<<(BitDepth_{C_{cur}}-1) \qquad (21)$$

denotes the zero mean of the current layer, and $$O_{ref} \text{ is } 1<<(BitDepth_{C_{ref}}-1) \qquad (22)$$

denotes the zero mean of the reference layer. Let $$bitShiftC=BitDepth_{C_{cur}}-BitDepth_{C_{ref}},$$

then $$S_C = \left(\frac{C_{PRED}-O_{cur}}{C_{REF}-O_{ref}}\right)>>bitShiftC. \qquad (23)$$

Without loss of generality, for simplicity, the following examples assume that all layers have the same bit-depth. As an example on how $S_C$ values may be generated, consider the case where $C_{REF}$ data are SDR data and need to be mapped into HDR data. In an embodiment, given a pair of SDR and HDR frames one may first compute the optimal scaling factors $$R_C = \frac{HDR_C - O}{SDR_C - O}$$

Next, one may generate a PWL representation of the $R_C$ data as a function of estimated $Y_{REF}$=RPRprocessing(SDR$_Y$) data. In an embodiment, an example workflow at the encoder side to generate the $S_C$ values and derive the corresponding PWL models may include the following steps:
1. For all chroma samples in component C on SDR plane $C_{REF}$ and HDR plane $C_{EL}$, at location (x, y), calculate the ratio at each location $$R_C(x, y) = \frac{C_{EL}(x, y) - O}{C_{REF}(x, y) - O}, \qquad (24)$$

where x=0, 1, . . . , chromaWidth−1, and y=0, 1, . . . chromaHeight−1.
2. Let $Y_{col}$(x, y) be the co-located luma sample of C (x, y) in the SDR luma plane $Y_{REF}$. Find the piece index idxY (x, y) for each $Y_{col}$(x, y):

$$idxY(x,y)=Y_{col}(x,y)>>(BitDepthY-4),$$

where, for a 16-piece PWL, idxY will be in the range [0,15].
3. for each piece i=0:15, initialize a non-negative ratio $R_i$ so that:

$$C_{PRED}(x,y)=O+R_i*(C_{REF}(x,y)-O) \text{ with } idxY(x,y)==i$$

$$C_{EL}(x,y)=O+R_C(x,y)*(C_{REF}(x,y)-O) \text{ with } idxY(x,y)==i$$

$$errorC_i=\Sigma_{idxY(x,y)==i}(|C_{EL}(x,y)-C_{PRED}(x,y)|)^n,$$

where n=1 when using an L1 metric and n=2 when using an L2 metric.
Minimizing errorC$_i$ is used to find R$_i$ values that yield smallest error for the i-th segment. In other words, within a specified range of luma values (e.g., within the i-th segment of a PWL representation), pixel-level scaling factors R$_C$(x, y) are now replaced by a fixed scaler R$_i$, and the goal is to identify that fixed scaler value which reduces the prediction error under some criterion.
4. construct PWL model and calculate syntax variables to be signaled in APS.
   OrgCW=1<<BitDepth$_Y$/16
   InputPivot[0]=0
   IlmsPivot[0]=0
   for piece i=0: 15
   InputPivot [i+1]=(i+1)*OrgCW
   IlmsPivot[i+1]=IlmsPivot[i]+Ri*OrgCW
   IlmsDeltaCW[i]=Ri*OrgCW−OrgCW
   End
   Given the LUT$_Y$ derived from the earlier step, one needs to approximate it using a PWL model and then generate the appropriate syntax elements (e.g., Table 1 or Table 4)
Finally, generate the coded bitstream using the remapping process. For example, assuming RPR processing precedes the dynamic-range remapping process, given an inter-layer reference block (ILRP) (C$_{ILRP}$) (e.g., a block in SDR P-frame 305-P1)

$$Y_{REF}=RPRprocess(Y_{ILRP}), \qquad (25)$$

$$C_{REF}=RPRprocess(C_{ILRP}), \qquad (26)$$

$$Y_{PRED}=LUT_Y[Y_{REF}]. \qquad (27)$$

$$C_{PRED}=O+S_C(C_{REF}-O). \qquad (28)$$

Similarly, in the decoder:
Receive and parse the ILMS APS syntax to extract the syntax elements of the PWL mapping
Construct the PWL model for the luma component based on the corresponding APS values
During decoding, apply the remapping to each ILRP block using equations (25-28). Note that as discussed earlier, in another embodiment, the order of RPR processing and remapping could also be reversed.
In the decoder, given LUT$_C$[ ], the mapping function derived from the piece-wise polynomial model signaled in the corresponding APS for the chroma component C, with input pivots Yi and output pivots Zi for the i-th segment, where i=0:15, the S$_C$ value (see equation (28)) corresponds to the first order derivative (slope) of LUT$_C$[ ] at Y$_{col}$, where Y$_{col}$ is the co-located luma sample in Y$_{REF}$, thus:

$$ScArray[i]=(Z_{i+1}-Z_i)/(Y_{i+1}-Y_i) \text{ for } i=0:15$$

the decoder can find the piece index idxY where Ycol belongs to as $$idxY=Y_{col}>>(BitDepthY-4)$$

and $$Sc=ScArray[idxY].$$

Figure 4B:
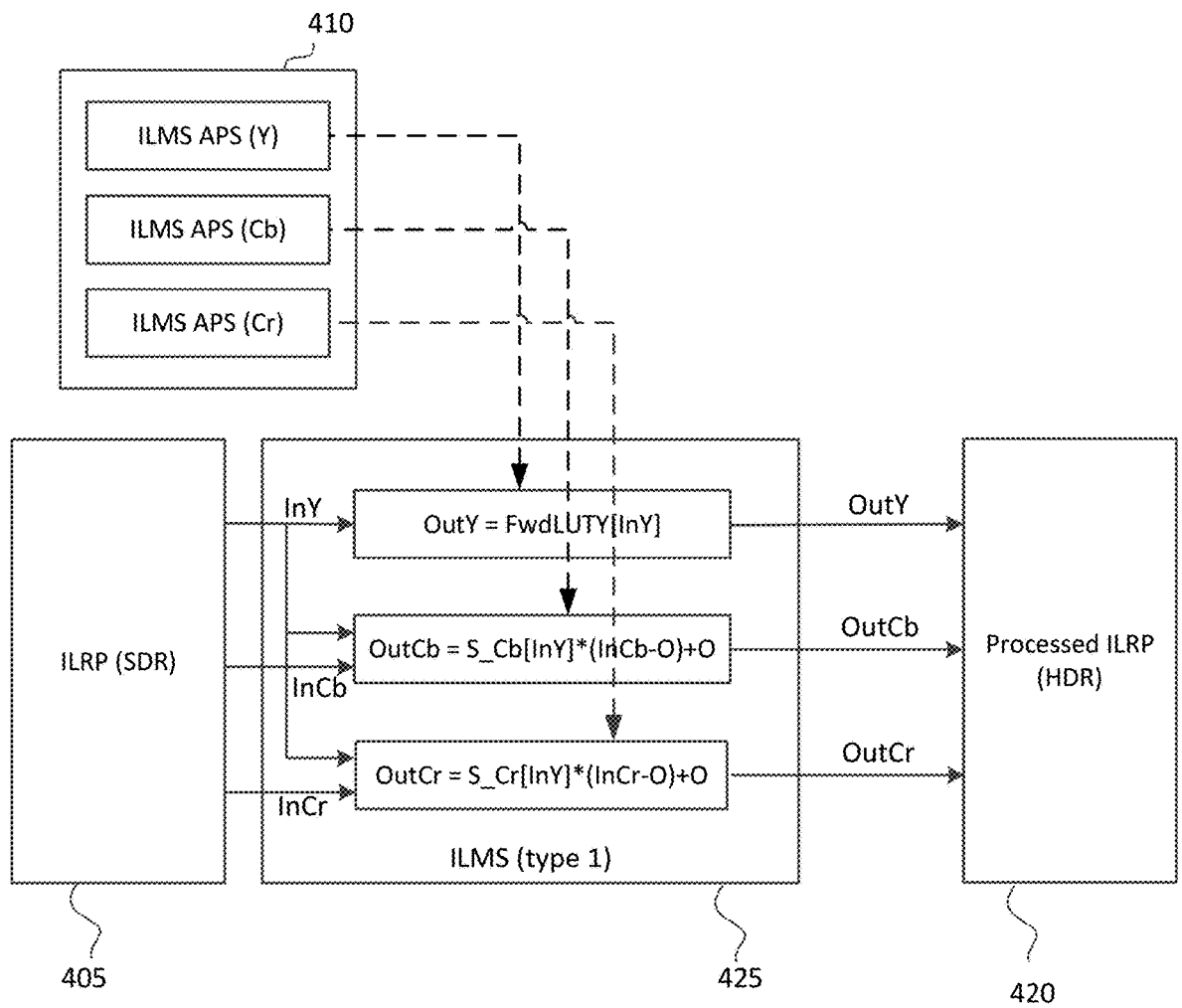
FIG. 4B depicts an example process for SDR to HDR dynamic-range scalability according to a second embodiment.

As an example, FIG. 4B depicts an example data flow for this embodiment, when remapping SDR data (405) into HDR data (420), where the remapping is performed for all three color components (e.g., Y, Cb, and Cr). Between the two models, the key difference is on how chroma components are generated in blocks 415 and 425 (e.g., in block 425, InY is an input to all three sub-blocks). For ease of reference, this embodiment will be referred to as ILMS (type 1).
Overall, this method better fits the characteristics of chroma components, so it is expected to provide better prediction for chroma, on the other hand, it requires to perform zero-mean extraction and addition, thus adding some additional complexity, not required in the traditional LMCS process.

While specific examples are given for YCbCr-coded signals, both of the described embodiments are applicable to video signals with other color formats (e.g., ICtCp, YDzDx, RGB, and the like); however, in some color formats, like RGB, the solution described in ILMS (type 1) may not be applicable.

Without loss of generality, the look-up-table mapping process (e.g., z=LUT[y]) can also be implemented using piece-wise linear interpolation of the type $z=Z_j+b_j*(y-Y_j)$, with j being the index of the PWL piece that z belongs to, as used in the current LMCS implementation method in VVC (Ref. [1]).

The proposed solution for inter-layer mapping and scaling (ILMS) is based on reusing the LMCS building blocks; however, there is no modification to the current LMCS pipeline and ILMS has no interaction with the LMCS coding tool in low level VVC decoder. Thus, both can be controlled independently. For example, if a base layer or an enhancement layer SPS did not enable the LMCS tool, inter-layer processing can still employ ILMS via signaled ILMS APS for scalability. Vice versa, inter-layer processing does not have to employ ILMS if it is not necessary, while each layer can enable its own LMCS coding tool.

It is possible that an enhancement layer which uses inter-layer prediction can have multiple inter layer reference pictures from multiple lower layers. In that case, separate ILMS_APSs can be specified for each inter reference picture. For example:

Layer 0: SDR 1080×720, BT.709, 30 fps

Layer 1: SDR 1920×1080, BT. 709, 60 fps (use ILRP from layer 0)

Layer 2: HDR 1920×1080, 1000 nits PQ, BT. 2100, 30 fps (use ILRP from layer 0 and layer 1)

Layer 3: HDR 3840×2160, 4000 nits PQ, BT. 2100, 60 fps (use ILRP from layer 1 and layer 2)

The order of the RPR (interpolation/resampling) and the proposed ILMS (inter-layer mapping and scaling) is interchangeable. Most of the example embodiments depict performing ILMS after RPR, but, as depicted in equations (9-10), dynamic-range mapping can also precede RPR processing. This may have advantages in computation savings (fewer samples involved in mapping) if the enhancement layer resolution is larger than the reference layer.

In an alternative signaling method (e.g., see Table 4), one may include all three PWL mapping functions into one APS structure, which may save signaling bandwidth.

ILMS Bitstream Syntax

In this section, a number of examples for bitstream syntax supporting dynamic range scalability via the proposed ILMS embodiments are provided. The syntax is described in terms of the existing VVC syntax in Ref. [1], and new elements may be denoted in italics.

For ease of reference, Table 1 provides a copy of the description of lmcs_data( ), as described in Section of 7.3.2.15 of Ref. [1].

TABLE 1

Luma mapping with chroma scaling data syntax

|  | Descriptor |
|---|---|
| lmcs_data ( ) { |  |
|   lmcs_min_bin_idx | ue(v) |
|   lmcs_delta_max_bin_idx | ue(v) |
|   lmcs_delta_cw_prec_minus1 | ue(v) |
|   for (i = lmcs_min_bin_idx; i <= LmcsMaxBinIdx; i++ ) { |  |
|     lmcs_delta_abs_cw[ i ] | u(v) |
|     if ( lmcs_delta_abs_cw[ i ] ) > 0 ) |  |
|       lmcs_delta_sign_cw_flag[ i ] | u(1) |
|   } |  |
| } |  |

Table 2 proposes adding ILMS_APS as a new syntax element in Table 7-2 of Ref. [1].

TABLE 2

Modified Table for APS parameters type codes

| aps_params_type | Name of aps_params_type | Type of APS parameters |
|---|---|---|
| 0 | ALF_APS | ALF parameters |
| 1 | LMCS_APS | LMCS parameters |
| 2 | SCALING_APS | Scaling list parameters |
| 3 | *ILMS_APS* | *ILMS parameters* |
| 4 . . . 7 | Reserved | Reserved |

Table 3 adds a new APS type in Table 7.3.2.5, "Adaptation parameter set syntax" of Ref. [1].

TABLE 3

Adaptation parameter set syntax supporting ILMS_APS

|  | Descriptor |
|---|---|
| adaptation_parameter_set_rbsp( ) { |  |
|   adaptation_parameter_set_id | u(5) |
|   aps_params_type | u(3) |
|   if( aps_params_type = = ALF_APS ) |  |
|     alf_data( ) |  |
|   else if( aps_params_type = = LMCS_APS ) |  |
|     lmcs_data( ) |  |
|   else if( aps_params_type = = SCALING_APS ) |  |
|     scaling_list_data( ) |  |
|   *else if( aps_params_type = = ILMS_APS )* |  |
|     *lmcs_data( ) or ilms_data( ) if new structure is used* |  |
|   aps_extension_flag | u(1) |
|   if( aps_extension_flag) |  |
|     while( more_rbsp_data( ) ) |  |
|       aps_extension_data_flag | u(1) |
|   rbsp_trailing_bits( ) |  |
| } |  |

As noted in Table 3, instead of using Table 1 for the structure of the forward mapping functions (lmcs_data( )), one could use an alternative implementation. An example of such an implementation is depicted in Table 4. Table 4 is similar to Table 1, but a new loop over cIdx is added to allow signaling up to three mapping functions using a single structure; thus only one APS is needed per slice to process all three components. In contrast, when using the semantics of Table 1 one need three APS per slice, because each one includes only one model. The semantics of most ilms syntax elements remain similar to those of the lmcs syntax. The detail of LMCS semantics can be found in clause 7.4.3.15 of Ref. [1]. (Luma mapping with chroma scaling data semantics).

TABLE 4

Example of alternative data structure for ilms_data( )

| | Descriptor |
|---|---|
| ilms_data ( ) { | |
|   ilms_single_model_flag | u(1) |
|   for( cIdx = 0; cIdx < (ilms_single_model_flag == 0 ? ( ChromaArrayType != 0 ? 3 : 1) : 1); cIdx++ ) | |
|     ilms_min_bin_idx[ cIdx ] | ue(v) |
|     ilms_delta_max_bin_idx[ cIdx ] | ue(v) |
|     ilms_delta_cw_prec_minus1[ cIdx ] | ue(v) |
|     for ( i = ilms_min_bin_idx[ cIdx ]; i <= IlmsMaxBinIdx[ cIdx ]; i++ ) { | |
|       ilms_delta_abs_cw[ cIdx ] [ i ] | u(v) |
|       if ( ilms_delta_abs_cw[ cIdx ] [ i ] ) > 0 ) | |
|         ilms_delta_sign_cw_flag[ cIdx ] [ i ] | u(1) |
|     } | |
|   } | |
| } | | ilms_single_model_flag equals to 1 specifies that only one model is present in this ilms_data( ). ilms_single_model_flag equals to 0 specifies that multiple models may present in this ilms_data( ).

ilms_min_bin_idx[cIdx] specifies the minimum bin index used in the inter layer mapping and scaling process for component cIdx. The value of ilms_min_bin_idx[cIdx] shall be in the range of 0 to 15, inclusive.

ilms_delta_max_bin_idx[cIdx] specifies the delta value between 15 and the maximum bin index IlmsMaxBinIdx[cIdx] used in the luma mapping with chroma scaling construction process for component cIdx. The value of ilms_delta_max_bin_idx[cIdx] shall be in the range of 0 to 15, inclusive. The value of IlmsMaxBinIdx[cIdx] is set equal to 15−ilms_delta_max_bin_idx[cIdx]. The value of IlmsMaxBinIdx[cIdx] shall be greater than or equal to ilms_min_bin_idx[cIdx].

ilms_delta_cw_prec_minus1[cIdx] plus 1 specifies the number of bits used for the representation of the syntax ilms_delta_abs_cw[cIdx] [i] for component cIdx. The value of ilms_delta_cw_prec_minus1[cIdx] shall be in the range of 0 to $BitDepth_{cIdx}-2$, inclusive.

ilms_delta_abs_cw[cIdx] [i] specifies the absolute delta codeword value for the i-th bin for component cIdx.

ilms_delta_sign_cw_flag[cIdx] [i] specifies the sign of the variable ilmsDeltaCW[cIdx] [i] for component cIdx as follows:

If ilms_delta_sign_cw_flag[cIdx] [i] is equal to 0, ilmsDeltaCW[cIdx] [i] is a positive value.

Otherwise (ilms_delta_sign_cw_flag[cIdx] [i] is not equal to 0), ilmsDeltaCW[cIdx] [i] is a negative value.

When ilms_delta_sign_cw_flag[cIdx] [i] is not present, it is inferred to be equal to 0.

The variable OrgCW[cIdx] is derived as follows:

$$OrgCW[cIdx]=(1<<BitDepth_{cIdx})/16$$

The variable ilmsDeltaCW[cIdx] [i], with i=ilms_min_bin_idx[cIdx] . . . IlmsMaxBinIdx[cIdx], is derived as follows:

$$ilmsDeltaCW[cIdx][i]=(1-2*ilms\_delta\_sign\_cw\_flag[cIdx][i])*ilms\_delta\_abs\_cw[cIdx][i]$$

The variable ilmsCW[cIdx] [i] is derived as follows:

For i=0 . . . ilms_min_bin_idx[cIdx]−1, ilmsCW[cIdx] [i] is set equal 0.

For i=ilms_min_bin_idx[cIdx] . . . IlmsMaxBinIdx[cIdx], the following applies:

ilmsCW[cIdx][i]=OrgCW[cIdx]+ilmsDeltaCW[cIdx][i]

For i=IlmsMaxBinIdx[cIdx]+1 . . . 15, ilmsCW[cIdx][i] is set equal 0.

It is a requirement of bitstream conformance that the following condition is true:

$$\Sigma_{i=0}^{15} ilmsCW[cIdx][i]<=(1<<BitDepth_{cIdx})-1$$

The variable InputPivot[cIdx][i], with i=0 . . . 16, is derived as follows:

InputPivot[cIdx] [i]=i*OrgCW[cIdx]

The variable IlmsPivot[cIdx][i] with i=0 . . . 16, and the variables ScaleCoeff[cIdx][i] with i=0 . . . 15, are derived as follows:

```
IlmsPivot[ cIdx ] [ 0 ] = 0;
for( i = 0; i <= 15; i++ ) {
    IlmsPivot[ cIdx ] [ i + 1 ] = IlmsPivot[ cIdx ] [ i ] + ilmsCW[ cIdx ] [ i ]
    ScaleCoeff[ cIdx ] [ i ] = (ilmsCW[ cIdx ] [ i ] * (1 << 11) + (1 <<
(Log2(OrgCW[ cIdx ]) − 1))) >> (Log2(OrgCW[ cIdx ]))
}
```

The variable ChromaScaleCoeff[cIdx] [i], with i=0 . . . 15, is derived as follows:

```
if ( ilmsCW[ cIdx ] [ i ] = = 0)
    ChromaScaleCoeff[ cIdx ] [ i ] = (1 << 11)
else
    ChromaScaleCoeff[ cIdx ] [ i ] = ScaleCoeff[ cIdx ] [ i ]
```

Table 5 provides an example of adding syntax in the VVC slice header (see Section 7.3.6.1 in Ref. [1]) to support inter-layer mapping and scaling.

TABLE 5

Example of slice header syntax supporting ILMS

| | Descriptor |
|---|---|
| slice_header( ) { | |
| ...... | |
|   if( sps_lmcs_enabled_flag ) { | |
|     slice_lmcs_enabled_flag | u(1) |
|     if( slice_lmcs_enabled_flag ) { | |
|       slice_lmcs_aps_id | u(2) |
|       if( ChromaArrayType != 0) | |
|         slice_chroma_residual_scale_flag | u(1) |
|     } | |
|   } | |
|   *if ( slice_type != I &&* | |

TABLE 5-continued

Example of slice header syntax supporting ILMS

| | Descriptor |
|---|---|
| !(vps_independent_layer_flag[ GeneralLayerIdx[ nuh_layer_id] ])) { | |
|     for ( j = 0; j < GeneralLayerIdx[ nuh_layer_id ]; j++ ) | |
|         if (vps_direct_dependency_flag[GeneralLayerIdx[ nuh_layer_id] ][ j ]) { | |
|             slice_ilms_enabled_flag[ j ] | u(1) |
|             if( slice_ilms_enabled_flag[ j ] ) { | |
|                 slice_ilms_chroma_bypass_flag[ j ] | u(1) |
|                 if !(slice_ilms_chroma_bypass_flag) | |
|                     slice_ilms_type[ j ] //used only with ilms_data( ) | u(1) |
|                 slice_ilms_aps_id[ j ] | u(5) |
|             } | |
|         } | |
|     } | |
| ...... | |

The new syntax elements are described as follows:
slice_ilms_enabled_flag[j] equal to 1 specifies that inter layer mapping and scaling is enabled on the inter layer reference picture from the j-th layer for the current slice. slice_ilms_enabled_flag[j] equal to 0 specifies that inter layer mapping and scaling is not enabled on the inter layer reference picture from the j-th layer for the current slice.
slice_ilms_chroma_bypass_flag[j] equal to 1 specifies that inter layer mapping and scaling is not performed on the chroma component of the inter layer reference picture from the j-th layer for the current slice. slice_ilms_chroma_bypass_flag[j] equal to 0 specifies that inter layer mapping and scaling is performed on all components of the inter layer reference picture from the j-th layer for the current slice.
slice_ilms_type[j] specifies the type of inter layer mapping and scaling to be performed on the inter layer reference picture from the j-th layer for the current slice. slice_ilms_type equal to 0 specifies that mapping process is performed to each component individually. slice_ilms_type equal to 1 specifies that mapping process is performed to the luma component, and luma-based scaling process is performed to the chroma components. When not present, the value of slice_ilms_type[j] is inferred to be equal to 0.

slice_ilms_aps_id[j] specifies the adaptation_parameter_set_id of the ILMS APS as in Table 4 that the slice refers to and to be used for the inter layer reference picture from the j-th layer. The TemporalId of the APS NAL unit having aps_params_type equal to ILMS_APS and adaptation_parameter_set_id equal to slice_ilms_aps_id[j] shall be equal to the TemporalID of the coded slice NAL unit.
Note: if one uses the old structure lmcs_data( ) as in Table 1, slice_ilms_aps_id[j] becomes slice_ilms_aps_id[j] [cIdx], and there is a need to loop over cIdx to signal different APS ids for different color components.

Assuming ILMS is performed after RPR, given the syntax elements described earlier, inter-layer processing can be performed as follows based on clauses 8.5.6.3.2 (8.5.6.3.2 Luma sample interpolation filtering process) and clause (8.5.6.3.4 Chroma sample interpolation filtering process).

For example, under ILMS type 0 (independent mapping), a mapping process similar to the one described in 8.7.5.2 is proposed to modify the inter predicted sample array predSampleLX$_L$ and predSampleLX$_C$. If crosscomponent scaling is used (ILMS type 1), then predSampleLX$_C$ is modified by a scaling process similar to that in clause 8.7.5.3.

Let ilrp_idc be the index of the layer used in inter-layer prediction for current slice. predSampleLX$_L$ modification:

```
if (slice_ilms_enabled_flag[ ilrp_idc ] == TRUE) {
    idxY = predSampleLX_L [ i ][ j ] >> Log2( OrgCW[ 0 ] )
    predMapSamplesLX_L [ i ][ j ]
    = IlmsPivot[ 0 ][ idxY ] + ( ScaleCoeff[ 0 ][ idxY ] * (predSampleLX_L[ i ][ j ] −
    InputPivot[ 0 ][ idxY ] ) + ( 1 << 10 ) ) >> 11
    with i = 0..nCurrSw − 1, j = 0..nCurrSh − 1
    predSampleLX_L [ i ][ j ] = Clip1Y(predMapSamplesLX_L [ i ][ j ])
}
predSampleLX_C modification:
    if (slice_ilms_enabled_flag[ ilrp_idc ] == TURE &&
    slice_ilms_chroma_bypass_flag[ilrp_idc ] == FALSE)
        if (slice_ilms_type[ ilrp_idc ] == 0) {
            idxC = predSampleLX_C [ i ][ j ] >> Log2( OrgCW[ c ] ) // c = 1 for Cb, 2 for
            Cr
            predMapSamplesLX_C [ i ][ j ] = IlmsPivot[ c ] [ idxC ] + ( ScaleCoeff[ c ]
            [ idxC ] * (predSampleLX_C[ i ][ j ] − InputPivot[ c ]
            [ idxC ] ) + ( 1 << 10 ) ) >> 11
            with i = 0..nCurrSw − 1, j = 0..nCurrSh − 1
            predSampleLX_C [ i ][ j ] = Clip1C(predMapSamplesLX_C [ i ][ j ])
        }
        else { // slice_ilms_type[ ilrp_idc ] == 1
            let refYcol [ i ][ j ] be the luma sample value in co-located position on the inter
            layer reference picture;
            idxYcol [ i ][ j ] = refYcol [ i ][ j ] >> Log2( OrgCW [ c ])
            varScale [ i ][ j ] = ChromaScaleCoeff[ c ][ idxYcol [ i ][ j ] ]
            zeroMeanPredSampleLX_C[ i ][ j ] =
            predSampleLX_C[ i ][ j ] − 1 << (BitDepth_C − 1)
```

```
predSampleLX_C [ i ][ j ] = Clip1_C(1 << (BitDepth_C − 1)
    + Sign( zeroMeanPredSampleLX_C[ i ][ j ] ) * ( ( Abs( zeroMeanPredSampleL
    X_C [ i ][ j ] ) * varScale [ i ][ j ]+ ( 1 << 10 ) ) >> 11 ) )
}
```

Note that variables such as OrgCW[c], InputPivot[c] [ ], IlmsPivot[c][ ], ScaleCoeff[c] [ ], and ChromaScaleCoeff[c] [ ] should be derived from each corresponding ilms_data( ) signaled in the active ILMS_APS for the current inter layer and current component.

REFERENCES

Each one of the references listed herein is incorporated by reference in its entirety.

[1] B. Bross, J. Chen, and S. Liu, *"Versatile Video Coding (Draft 6),"* JVET output document, JVET-O2001, vE, uploaded, Jul. 31, 2019.

[2] PCT Application PCT/US2019/017891, *Image Reshaping in Video Coding Using Rate Distortion Optimization*, filed on Feb. 13, 2019, by P. Yin et al.

[3] *"Algorithm description for Versatile Video Coding and Test Model 4 (VTM 4),"* J. Chen et al., JVET Output document, JVET-M1002-v2, $13^{th}$ Meeting, Marrakech, 9-18 Jan. 2019.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to inter-layer dynamic range mapping and scaling of images, such as those described herein. The computer and/or IC may compute any of a variety of parameters or values that relate to inter-layer dynamic range mapping and scaling processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to inter-layer dynamic range mapping and scaling of images as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to the efficient inter-layer dynamic range mapping and scaling of images are thus described. In the foregoing specification, embodiments of the present invention have been described with reference to numerous specific details that may vary from implementation to implementation. Thus, the sole and exclusive indicator of what is the invention and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to decode a coded video bitstream in multiple dynamic ranges, the method performed by a processor and comprising:

receiving a coded bitstream comprising layers of video frames, wherein a first layer of frames is coded in a first dynamic range and a second layer of frames is coded in a second dynamic range different than the first dynamic range;

receiving metadata for the coded bitstream, wherein the metadata comprise:
 a flag indicating that dynamic-range scalability is enabled; and
 a mapping data structure comprising parameters to determine a mapping function for mapping pixel values from the first dynamic range to the second dynamic range; and decoding a video frame in the second layer with reference to a video frame in the first layer using inter-layer mapping and scaling, wherein inter-layer mapping and scaling comprises:
 generating a first mapping function based on the mapping data structure;
 decoding an input reference frame in the first layer in the first dynamic range, wherein the input reference frame comprises a first color component and a second color component;

mapping the input reference frame in the first layer to an output reference frame in the second dynamic range based on the first mapping function; and generating an output frame in the second dynamic range based on the video frame in the second layer and the output reference frame in the second dynamic range.

2. The method of claim 1 wherein mapping the input reference frame to the output reference frame comprises generating a first output color component of the output reference frame by mapping the first color component of the input reference frame from the first dynamic range to the second dynamic range based on the first mapping function.

3. The method of claim 2, further comprising generating a second output color component of the output reference frame by mapping the second color component of the input reference frame from the first dynamic range to the second dynamic range based on the first mapping function.

4. The method of claim 2, further comprising:
generating a second mapping function based on the mapping data structure; and
generating a second output color component of the output reference frame by mapping the second color component of the input reference frame from the first dynamic range to the second dynamic range based on the second mapping function.

5. The method of claim 2, wherein the first color component comprises a luminance component and the method further comprising:
computing scaling factors based on the mapping data structure and the luminance component of the input reference frame; and generating a second output color component of the output reference frame by mapping the second color component of the input reference frame from the first dynamic range to the second dynamic range based on the scaling factors.

6. The method of claim 1 wherein the first layer of frames is coded in a first spatial resolution and the second layer of frames is coded in a second spatial resolution different than the first dynamic range, and the method further comprises:
spatially scaling the input reference frame in the first dynamic range to the second spatial resolution before the mapping to the second dynamic range.

7. The method of claim 1 wherein the first layer of frames is coded in a first spatial resolution and the second layer of frames is coded in a second spatial resolution different than the first dynamic range, and the method further comprises:
spatially scaling the output reference frame in the second dynamic range to the second spatial resolution after the mapping to the second dynamic range.

8. The method of claim 1 wherein decoding the video frame in the second layer further comprises utilizing a linear mapping and scaling operation and the method further comprises combining the inter-layer mapping and scaling with the linear mapping and scaling.

9. An apparatus comprising a processor and configured to perform a method as recited in claim 1.

10. A non-transitory computer-readable storage medium having stored thereon computer-executable instructions for executing a method with one or more processors in accordance with claim 1.

* * * * *